United States Patent [19]

Plummer et al.

[11] 3,997,451

[45] Dec. 14, 1976

[54] SULFONATE BLENDS USEFUL FOR IMPROVED OIL RECOVERY

[75] Inventors: Mark A. Plummer; Wayne O. Roszelle, both of Littleton, Colo.

[73] Assignee: Marathon Oil Company, Findlay, Ohio

[22] Filed: Dec. 23, 1974

[21] Appl. No.: 535,531

Related U.S. Application Data

[62] Division of Ser. No. 387,413, Aug. 10, 1973, Pat. No. 3,901,317.

[52] U.S. Cl. .......................... 252/8.55 D; 166/274; 252/312

[51] Int. Cl.$^2$ .......................... E21B 43/22

[58] Field of Search .......... 166/273, 274, 275, 252; 252/8.55 D, 312

[56] References Cited

UNITED STATES PATENTS

| | | |
|---|---|---|
| 3,288,213 | 11/1966 | King et al. .................... 166/274 |
| 3,302,713 | 2/1967 | Ahearn et al. .................... 166/274 |
| 3,491,834 | 1/1970 | Ahearn et al. .................... 166/273 |
| 3,500,912 | 3/1970 | Davis et al. .................... 166/252 |
| 3,623,553 | 11/1971 | Burdge .................... 166/275 |
| 3,697,424 | 10/1972 | Holm .................... 252/8.55 |

*Primary Examiner*—Herbert B. Guynn
*Attorney, Agent, or Firm*—Joseph C. Herring; Jack L. Hummel

[57] ABSTRACT

Improved oil recovery is realized by flooding oil-bearing subterranean formations with an aqueous mixture, preferably a micellar dispersion, comprised of at least two different petroleum sulfonates, the sulfonates have an average equivalent weight within the range of about 390–450, and have an aliphatic to aromatic proton (A/AP) ratio within the range of 4–20 moles per mole but the two sulfonates have a difference in their respective A/AP ratio of at least 2.5 moles per mole.

8 Claims, No Drawings

SULFONATE BLENDS USEFUL FOR IMPROVED OIL RECOVERY

This is a division of application Ser. No. 387,413, filed Aug. 10, 1973, now U.S. Pat. No. 3,901,317.

BACKGROUND OF THE INVENTION

1. Field of the Invention

An aqueous mixture of petroleum sulfonates is injected into a subterranean formation and displaced toward a production means to recover crude oil therethrough.

2. Description of the Prior Art

Aqueous petroleum sulfonate mixtures are effective to recover crude oil in primary, secondary, and tertiary recovery processes. For example, the mixture can be injected into an oil-bearing subterranean formation and displaced towards a production well to recover crude oil. Mobility buffer slugs, i.e. aqueous solutions containing mobility reducing agents, can be injected behind the mixture to improve oil recovery.

U.S. Pat. Nos. 3,254,714 and 3,275,075 to Gogarty et al, 3,497,006 to Jones et al and 3,506,070 to Jones teach processes using petroleum sulfonate in micellar dispersions.

The prior art teaches that the petroleum sulfonates desirably have an average equivalent weight within the range of 350 to 525. Other additives may be present in the aqueous petroleum sulfonate mixture to enhance oil recovery, e.g. hydrocarbon, cosurfactant, electrolyte, mobility reducing agent, viscosity reducing agent, etc.

Applicants have discovered a novel combination of petroleum sulfonates to obtain a more efficient oil recovery process.

SUMMARY OF THE INVENTION

Applicants recover increased amounts of oil using an aqueous petroleum sulfonate mixture containing at least two different petroleum sulfonates, the sulfonates have an average equivalent weight within the range of about 390–450 and preferably 395–440, the hydrocarbon portion of the sulfonate has an average aliphatic to aromatic proton (A/AP) ratio within the range of about 4–20 moles per mole (i.e. the average sulfonate molecule contains 4–20 aliphatic protons per aromatic proton) but the different sulfonates have a distribution or difference in their respective A/AP ratio of at least 2.5 moles per mole. Optionally, a viscosity increasing agent, a mobility reducing agent, corrosion inhibitors, oxygen scavengers, cosurfactant, electrolyte, etc., or combinations of two or more of these materials can be incorporated into the aqueous sulfonate mixture.

DESCRIPTION OF THE PREFERRED EMBODIMENTS

The aqueous petroleum sulfonate mixture contains at least two different petroleum sulfonates, i.e. the hydrocarbon portion of the sulfonates is at least different. Optionally, a viscosity-increasing agent, mobility reducing agent, hydrocarbon, cosurfactant, electrolyte, or combination thereof can be incorporated into the mixture. Examples of amounts include 1% to about 25%, preferably about 2 to about 12% and most preferably at least about 4% by volume of petroleum sulfonates, about 0.01 to about 20% by volume cosurfactant, about 0.001 to about 5% weight (based on aqueous medium) of electrolyte, about 1 to about 90% and preferably at least about 4% by volume hydrocarbon, about 0.001 to about 1% or more by weight of the viscosity-increasing agent and/or mobility reducing agent and the residue aqueous medium (preferably at 5 to about 95% by volume). The aqueous mixture can be a micellar dispersion (this term as used herein includes micellar solution and microemulsion), an emulsion, solution, etc.

The aqueous medium can be soft water, water containing minor amounts of salts, or brackish water. The cosurfactant can be an amine, aldehyde, ketone, hydroxy-containing compound (including conventional alcohols), ester, ether, or similar compound containing one or more of hydroxy, oxy, amide, halide, etc; the cosurfactant contains 1 to about 20 or more carbon atoms and preferably about 3 to about 8 carbon atoms. Numerous electrolytes are useful; preferably they are inorganic acids, inorganic bases, and inorganic salts. The hydrocarbon can be crude oil, a partially refined fraction of crude oil, or refined fraction of crude oil, or synthetic hydrocarbon (including halogenated hydrocarbons); the hydrocarbon can be unreacted hydrocarbon within the petroleum sulfonate. Examples of patents which teach particular components useful in the aqueous sulfonate mixture include: U.S. Pat. Nos. 3,254,714 to Gogarty et al; 3,307,628 to Sena; 3,330,343 to Tosch et al; 3,356,138 to Davis et al; 3,297,084 to Gogarty et al; 3,476,184 to Davis; 3,497,006 to Jones et al; 3,493,047 to Davis et al; 3,493,048 to Jones; 3,500,912 to Davis et al; 3,504,744 to Davis et al; 3,506,070 and 3,506,071 to Jones; and 3,508,611 to Davis et al.

Examples of viscosity increasing agents are the biopolymers such as polysaccharide polymers (e.g. defined in U.S. Pat. No. 3,020,206 to Patton et al and 3,020,207 to Patton) or any high molecular weight organic polymer that tends to increase the viscosity of the water and which will not substantially sorb onto the reservoir rock. Examples of mobility reducing agents include acrylamide polymers, e.g. the partially hydrolyzed, high molecular weight polyacrylamides such as the Pusher polymers marketed by Dow Chemical Co., Midland, Michigan; copolymers of acrylamide and acrylic acid or sodium acrylate, N-sulfohydrocarbon-substituted acrylamides (e.g. defined in U.S. Pat. No. 3,679,000 to Kaufman), and commercially available polymers such as Betz Hi-Vis and Betz-Uni-Perm polymers (Betz Laboratories, Inc., Trevose, Pennyslvania), acrylamide polymers sold by Calgon Coporation, Pittsburgh, Pennsylvania, and acrylamide copolymers marketed by Nalco Chemical Co., Chicago, Illinois. Any high molecular weight polymer which tends to reduce the mobility of the aqueous surfactant mixture flowing through the reservoir rock is useful with this invention. The agents can be present in concentration ranges of about 0.001 to about 1% and preferably about 0.01 to about 0.5% and more preferably about 0.02 to 0.1% by weight, based on the aqueous mixture.

Other additives, such as corrosion inhibitors, oxygen scavengers, bactericides, etc. can be added to the mixture.

The petroleum sulfonates can be obtained by sulfonating hydrocarbon feedstocks, e.g. heavy vacuum gas oil, having molecular weights within the range of about 300 to about 650 and more preferably about 400 to about 470. Sulfonation of the feedstock is effected by methods known in the art, e.g. with oleum or sulfur trioxide in the absence or presence of a solvent such as ethylene dichloride, sulfur dioxide, unreacted hydrocarbon, etc. The sulfonic acid is neutralized with a basic compound such as sodium hydroxide, ammonia, ammonium hydroxide, etc.

As mentioned previously, at least two different petroleum sulfonates are used. These petroleum sulfonates have an average equivalent weight within the range of about 390 to about 450 and preferably about 395 to about 440 and more preferably about 400 to about 430. The petroleum sulfonates have an average A/AP ratio within the range of about 4 to about 20 moles per mole and preferably about 9 to about 15 moles per mole and more preferably about 9.4 to about 14.5 moles/mole—that is 4 to 20 aliphatic hydrogen protons per aromatic hydrogen proton are present in the hydrocarbon portion of the petroleum sulfonate. However, the A/AP ratios of the at least two petroleum sulfonates must have a distribution or difference of at least 2.5, i.e. the average A/AP ratio of one sulfonate must be different from the average A/AP ratio of the other sulfonate by a magnitude of at least 2.5 and preferably at least 3 and more preferably at least 3.8.

To obtain the two different petroleum sulfonates, at least two different feedstocks are generally preferred. One feedstock can have, for example, an average molecular weight range of about 400–430 while the other one can have an average molecular weight range of about 430–470. Also, the feedstocks should be of sufficient hydrocarbon character to obtain the desired A/AP ratios as indicated above.

Examples of volume amounts of useful aqueous petroleum sulfonate mixtures injected into the reservoir are about 1 to about 50% or more formation pore volume, preferably about 1 to about 15 and most preferably about 2 to about 10% formation pore volume. Larger pore volumes are, of course, useful where the economics of the process justifies same.

Preferably, the aqueous sulfonate mixture is followed by a mobility buffer slug. The mobility buffer slug is preferably an aqueous solution containing a mobility reducing agent such as a partially hydrolyzed, high molecular weight polyacrylamide, e.g. the Pusher polymers marketed by Dow Chemical Co., Midland, Michigan, a high molecular weight polyalkylene oxide polymer, high molecular weight acrylamide polymers containing sulfo grouping (e.g. those defined in U.S. Pat. No. 3,679,000 to Kaufman), acrylamide copolymers (e.g. copolymers of acrylamide and sodium acrylate), etc., biopolymers (preferred in low permeability reservoirs) and any high molecular weight polymer that is compatible within the reservoir and which tends to reduce the mobility of the aqueous solution flowing through the reservoir rock. The mobility buffer can be injected into the reservoir in volume amounts of about 5 to about 150%, preferably 25 to about 75% and more preferably 50 to about 60% formation pore volume. The mobility reducing agent can be present in concentrations of about 50 to about 2000, preferably about 100 to about 1500 and more preferably about 200 to about 1000 ppm, based on the water.

A water drive is injected into the reservoir to displace the aqueous sulfonate mixture and optionally the mobility buffer toward a production well to recover crude oil therethrough. Preferably, the water is compatible with the back portion of the mobility buffer and/or the aqueous sulfonate mixture, e.g. preferably it does not substantially leach water soluble components out of the preceding slug. Where the water drive contains ions, it is preferred that these ions are compatible with those within the reservoir.

Preferably, the "mobility profile" of the overall process is graded from a "low" mobility equal to or less than the mobility of the combination of formation fluids (crude oil and interstitial water within the formation) to a "high" mobility equal to or approaching that of the injected water drive. The mobility of the front, mid-section, and back portion of the mobility buffer and optionally of the aqueous sulfonate slug can be designed by adjusting the viscosity and/or mobility agent concentration to obtain desired mobility characteristics to the process.

EXAMPLES

Examples are presented to teach specific embodiments of the invention. Unless otherwise specified, all percents are based on volume:

Petroleum sulfonates are obtained by sulfonating different heavy vacuum gas oil feedstocks. For example, sulfonates A and B are obtained from feedstocks having average molecular weights of 400–430 and 430–470, respectively. Sulfonation is effected with sulfur trioxide in the presence of a diluent and the sulfonic acids are neutralized with ammonia. The resulting average equivalent weights of petroleum sulfonates A and B are 401 and 423 and have A/AP ratios of 9.6 and 13.4, respectively. Sulfonates C-D are obtained by same process except the feedstocks and process conditions are changed to give sulfonic properties indicated in the following examples. Micellar dispersions are prepared with these petroleum sulfonates by blending the following components:

|  | Weight Percent |
|---|---|
| 1) petroleum sulfonate | |
| a) $—SO_3 NH_4$ portion of the sulfonate | 2.0 |
| b) Total sulfonate (organic portion + $—SO_3 NH_4$ portion) | 8.0–9.0 |
| c) Vehicle Oil | 1.0–1.6 |
| 2) Water | 70.0 |
| 3) Crude oil (viscosity = 7 cp at 23° C) | 18.9–20.7 |
| 4) Electrolyte | 0.3–0.5 |

The micellar dispersions are used to flood core samples in Example 1.

EXAMPLE I

Berea sandstone core samples 4 feet long and 3 inches in diameter are first saturated with water, then flooded with oil and thereafter flooded with water to residual oil saturation. Thereafter, 2% formation pore volume of the micellar dispersion, containing petroleum sulfonates having properties exhibited in Table 1, are injected into the core samples. The micellar dispersion is followed by at least one formation pore volume of water containing 1,000 ppm of Pusher 700 polymer (a partially hydrolyzed, high molecular weight polyacrylamide marketed by Dow Chemical Co., Midland, Michigan). The results of the core flooding, the sulfonate properties and the properties of the micellar dispersion are indicated in Table 1:

TABLE I

HIGH OIL-RECOVERY EFFICIENCIES OBTAINED WITH SULFONATE BLENDS EXHIBITING APPROPRIATE EQUIVALENT WEIGHT AND A/AP AVERAGES AND DISTRIBUTIONS

| Run No. | Blend Ratio Wt %/Wt % * | Sulfonate Properties | | | | Properties of Micellar Dispersions | | | |
|---|---|---|---|---|---|---|---|---|---|
| | | Eq. Wt. Distrib. | Average Eq. Wt. | A/AP Distrib. | Avg. A/AP Ratio | Viscosity at 72° F Centipoises | Electrolyte Content-Wt. % | | Oil-Rec. Efficiency Vol. |
| | | | | | | | $(NH_4)_2SO_4$ | $CaCl_2$ | |
| 1 | 50-A/50-B | 401–423 | 412 | 9.6–13.4 | 11.5 | 62 | 0.50 | 0.00 | 82.6 |
| 2 | 25-C/75-D | 400–426 | 419 | 9.6–13.4 | 12.5 | 28 | 0.50 | 0.00 | 78.0 |

*Sulfonate A:avg. eq. wt. = 401, A/AP = 9.6;
sulfonate B:avg. eq. wt. = 423, A/AP = 13.4
Sulfonate C:avg. eq. wt. = 400, A/AP = 9.6;
sulfonate D:avg. eq. wt. = 426, A/AP = 13.4

EXAMPLE II

This example is presented to show oil recoveries with similar sulfonates in micellar solutions. The flooding procedure defined in Example I is followed; results of the tests are presented in Table 2:

TABLE II

POOR OIL-RECOVERY EFFICIENCIES OBTAINED WITH SULFONATE BLENDS EXHIBITING INAPPROPRIATE EQUIVALENT WEIGHTS

| Run No. | Blend Ratio Wt %/Wt % * | Eq. Wt. Distrib. | Average Eq. Wt. | A/AP Distrib. | Avg. A/AP Ratio | Viscosity at 72° F. Centipoises | Electrolyte Content-Wt. % | | Oil-Rec. Efficiency Vol. |
|---|---|---|---|---|---|---|---|---|---|
| | | | | | | | $(NH_4)_2SO_4$ | $CaCl_2$ | |
| 3 | 50-E/50-F | 362–460 | 405 | 9.6–13.4 | 11.5 | 49 | 0.50 | 0.00 | 64.8 |
| 4 | 60-G/40-H | 417–451 | 430 | 9.6–13.4 | 11.1 | 48 | 0.50 | 0.00 | 66.6 |
| 5 | 40-I/60-J | 393–428 | 413 | 9.6–13.4 | 11.9 | 25 | 0.42 | 0.03 | 70.1 |
| 6 | 50-K/50-L | 380–423 | 400 | 9.6–13.4 | 11.5 | 42 | 0.50 | 0.00 | 75.6 |

Properties of Sulfonates:

| Sulfonate | Average Equivalent Weight | A/AP Ratio |
|---|---|---|
| E | 362 | & 9.6 |
| F | 460 | 13.4 |
| G | 417 | 9.6 |
| H | 451 | 13.4 |
| I | 393 | 9.6 |
| J | 428 | 13.4 |
| K | 380 | 9.6 |
| L | 423 | 13.4 |

The petroleum sulfonates used in Table 2 do not have the appropriate equivalent weights, and thus lower oil recoveries are obtained.

EXAMPLE III

Also, poor oil recoveries are obtained with sulfonate blends exhibiting inappropriate A/AP ratio distribution. The cores are flooded as described in Example 1 and results are reported in Table 3:

EXAMPLE IV

A 4 foot long by 3 inches diameter Berea sandstone core in a tertiary condition is flooded with 5% pore volume of an aqueous mixture containing 8% of a 50–50 mixture of sulfonates C and D, 200 ppm of Pusher polymer 700 Series (a partially hydrolyzed, high molecular weight polyacrylamide marketed by Dow Chemical Co.,). This aqueous sulfonate mixture is followed by 50% pore volume of an aqueous slug containing 700 ppm of the Dow Pusher Polymer 700 Series. Thereafter, water is injected to displace the two previously injected slugs through the core. Substantial amounts of oil are recovered.

TABLE III

POOR OIL-RECOVERY EFFICIENCIES OBTAINED WITH SULFONATE BLENDS EXHIBITING INAPPROPRIATE A/AP DISTRIBUTIONS

| Run No. | Blend Ratio Wt %/Wt % | Sulfonate Properties | | | | | Properties of Micellar Dispersions | | | |
|---|---|---|---|---|---|---|---|---|---|---|
| | | Eq. Wt. Distrib. | Average Eq. Wt. | A/AP Distrib. | Average A/AP Ratio | Difference of A/AP Ratio | Viscosity at 72° F Centipoises | Electrolyte Content-Wt. % | | Oil Recovery Efficiency Vol.% |
| | | | | | | | | $(NH_4)_2SO_4$ | $CaCl_2$ | |
| 7 | 80-M/20-N | 424–428 | 425 | 11.2–13.4 | 11.6 | 2.2 | 29 | 0.33 | 0.05 | 69.4 |
| 8 | 50-O/50-P | 424–428 | 426 | 11.2–13.4 | 12.3 | 2.2 | 29 | 0.32 | 0.03 | 73.7 |

Properties of Sulfonates:

| Sulfonate | Average Equivalent Weight | A/AP Ratio |
|---|---|---|
| M | 424 | 11.2 |
| N | 428 | 13.4 |
| O | 424 | 11.2 |
| P | 428 | 13.4 |

Table 3 indicates that without the appropriate A/AP distribution, less oil is recovered as compared to the petroleum sulfonates defined in Table 1 wherein the A/AP distribution is at least greater than 2.5.

EXAMPLE V

The process of Example IV is duplicated except the Pusher polymer within the aqueous sulfonate mixture slug is replaced with an equal mount of Kelzan-M, identified as a polysaccharide manufactured by Xanco Division of Kelco Corporation. Substantial amounts of oil are recovered by this process.

It is not intended that the above invention be limited by the examples. Rather, all equivalents obvious to those skilled in the art are intended to be incorporated within the scope of the invention as defined in the specification and appended claims.

What is claimed is:

1. A micellar dispersion compatible with crude oil and having the property of imparting improved oil recovery when displaced through an oil-bearing reservoir, comprised of hydrocarbon, petroleum sulfonates and aqueous medium wherein the petroleum sulfonates are comprised of at least two different petroleum sulfonates defined as:
   1. each sulfonate having an average equivalent weight within the range of about 395 to about 440,
   2. each sulfonate having an aliphatic to aromatic proton ratio within the range of about 4 to about 20 moles/mole, but,
   3. the sulfonates having different aliphatic to aromatic proton ratios of a magnitude of at least about 2.5 moles/mole.

2. The micellar dispersion of claim 1 wherein the petroleum sulfonates have a different aliphatic to aromatic proton ratio of at least 3.8 moles/mole.

3. The micellar dispersion of claim 1 wherein the average equivalent weight of the petroleum sulfonates is within the range of about 400 to about 430.

4. The micellar dispersion of claim 1 wherein the petroleum sulfonates have an aliphatic to aromatic proton ratio within the range of about 9.4 to about 14.5 moles/mole.

5. The micellar dispersion of claim 1 wherein the distribution of the aliphatic to aromatic proton ratio of the two different sulfonates is of a magnitude of at least about 3.0 moles/mole.

6. The micellar dispersion of claim 1 wherein it contains about 0.001 to about 5% by wt, based on the aqueous medium, of electrolyte.

7. A micellar dispersion compatible with crude oil consisting essentially of hydrocarbon, petroleum sulfonates, aqueous medium and electrolyte wherein the petroleum sulfonates are defined as:
   1. each of the sulfonates has an average equivalent weight within the range of about 400 to about 430,
   2. each of the sulfonates has an aliphatic to aromatic proton ratio within the range of about 5 to about 15 moles/mole, but,
   3. the sulfonates having different aliphatic to aromatic proton ratios of a magnitude of at least about 3 moles/mole.

8. The micellar dispersion of claim 7 wherein the sulfonates have different aliphatic to aromatic proton ratios of a magnitude of at least 3.8 moles/mole.

* * * * *